(12) United States Patent
Fustinoni (10) Patent No.: US 12,286,746 B2
(45) Date of Patent: Apr. 29, 2025

(54) LASER FINISHING METHOD AND APPARATUS FOR PROVIDING A FINISHING PATTERN ON A WORKPIECE

(71) Applicant: SEI S.p.A., Curno (IT)

(72) Inventor: Ettore Fustinoni, Curno (IT)

(73) Assignee: SEI S.p.A., Curno BG (IT)

(*) Notice: Subject to any disclaimer, the term of this patent is extended or adjusted under 35 U.S.C. 154(b) by 794 days.

(21) Appl. No.: 17/264,360

(22) PCT Filed: Aug. 1, 2019

(86) PCT No.: PCT/EP2019/070824
§ 371 (c)(1),
(2) Date: Jan. 29, 2021

(87) PCT Pub. No.: WO2020/025771
PCT Pub. Date: Feb. 6, 2020

(65) Prior Publication Data
US 2021/0301460 A1 Sep. 30, 2021

(30) Foreign Application Priority Data
Aug. 1, 2018 (EP) .................................... 18186840

(51) Int. Cl.
*B23K 26/082* (2014.01)
*B23K 26/00* (2014.01)
(Continued)

(52) U.S. Cl.
CPC ....... *D06M 10/005* (2013.01); *B23K 26/0006* (2013.01); *B23K 26/0626* (2013.01);
(Continued)

(58) Field of Classification Search
CPC ............. D06M 10/005; B23K 26/0006; B23K 26/0626; B23K 26/082; B23K 26/352;
(Continued)

(56) References Cited

U.S. PATENT DOCUMENTS 5,567,207 A 10/1996 Lockman et al.
6,819,972 B1 † 11/2004 Martin
(Continued)

FOREIGN PATENT DOCUMENTS

CN 104014935 A † 3/2014
CN 104 014 935 9/2014
(Continued)

OTHER PUBLICATIONS

De Loor, Ronny and Slagle, Rick. Mega-speed and precision micromachining. Sep. 12, 2014. Laser Focus World. (Year: 2014).*
(Continued)

*Primary Examiner* — Chris Q Liu (57) ABSTRACT

A method of providing a finishing pattern on a workpiece by a laser apparatus comprises providing a pulsed laser source, generating an output laser beam, a control unit for controlling the laser source and moving means for the laser beam. The method includes providing command instructions for operating the laser apparatus to scribe a predetermined finishing pattern on a workpiece and operating the laser source and the moving means to generate output laser beam for scribing lines of the predetermined finishing pattern on the workpiece according to the command instructions. The step of operating the laser source comprises at least one operating mode wherein the energy per unit surface delivered by the laser beam is variable, by changing the scanning speed of the laser beam and wherein the output power of the laser source and/or the duty cycle are maintained at a constant value.

21 Claims, 6 Drawing Sheets

(51) Int. Cl.
*B23K 26/06* (2014.01)
*B23K 26/352* (2014.01)
*B23K 26/361* (2014.01)
*B23K 26/402* (2014.01)
*D06B 11/00* (2006.01)
*D06M 10/00* (2006.01)
*D06P 5/20* (2006.01)
*B23K 103/00* (2006.01)

(52) U.S. Cl.
CPC .......... *B23K 26/082* (2015.10); *B23K 26/352* (2015.10); *B23K 26/361* (2015.10); *B23K 26/402* (2013.01); *D06B 11/0096* (2013.01); *D06P 5/2005* (2013.01); *B23K 2103/38* (2018.08)

(58) Field of Classification Search
CPC ................ B23K 26/361; B23K 26/402; B23K 2103/38; B23K 26/08; B23K 2101/007; B23K 2103/50; B23K 26/03; B23K 26/0622; B23K 26/0624; B23K 26/0846; B23K 2103/34; B23K 2103/36; B23K 26/00; B23K 26/032; B23K 26/0344; B23K 26/06; B23K 26/064; B23K 26/0648; B23K 26/0665; B23K 26/067; B23K 26/0673; B23K 26/0676; B23K 26/083; B23K 26/0853; B23K 26/0869; B23K 26/0876; B23K 26/10; B23K 26/342; B23K 26/355; B23K 26/359; B23K 26/384; B23K 26/386; B23K 26/389; B23K 26/702; D06B 11/0096; D06P 5/2005; D06P 5/13; D06P 5/15
USPC ............ 219/121.69, 121.68, 121.61, 121.85, 219/121.6, 121.82
See application file for complete search history.

(56) References Cited

U.S. PATENT DOCUMENTS

| | | | |
|---|---|---|---|
| 10,858,772 B2 † | 12/2020 | Carbonell Madern | |
| 2002/0179580 A1 † | 5/2002 | Costin | |
| 2005/0061781 A1 * | 3/2005 | Jense | B23K 26/046 219/121.74 |
| 2007/0245956 A1 * | 10/2007 | Ruuttu | B23K 26/0643 118/620 |
| 2010/0283825 A1 * | 11/2010 | Vila Closas | B23K 26/402 347/225 |
| 2015/0049593 A1 | 2/2015 | Oliveira | |
| 2015/0079359 A1 † | 3/2015 | Costin, Jr. | |
| 2017/0064839 A1 | 3/2017 | Lee et al. | |
| 2017/0144253 A1 | 5/2017 | Martinsen et al. | |
| 2017/0320168 A1 * | 11/2017 | Martinsen | B22F 12/90 |
| 2018/0049496 A1 † | 2/2018 | Benefiel et al. | |

FOREIGN PATENT DOCUMENTS

| | | | |
|---|---|---|---|
| ES | 2203348 A1 † | 4/2004 | |
| WO | 02064874 A2 | 8/2002 | |
| WO | WO2008/091898 A1 † | 7/2008 | |
| WO | 2018112110 A1 | 6/2018 | |

OTHER PUBLICATIONS

International search report and written opinion issued on Oct. 9, 2019 for PCT/EP2019/070824.

Thorlabs, Wikipedia, retrieved fro the internet on Dec. 18, 2023, https://en.wikipedia.org/wiki/Thorlabs, filed by the Patent Proprietor with the EPO on Dec. 22, 2023 against the Notice of Opposition filed by Jeanologia.

Notice of Opposition and relvant facts and arguments filed by Jeanologia, S.L. with the EPO on Aug. 1, 2023 for corresponding EP3829808.

Pulsed Lasers, Introduction to Power and Energy Calculations' by Thorlabs (attached as A1, and retrievable at https://www.thorlabs.com/images/tabimages/Laser_Pulses_Power_Energy_Equations.pdf) filed by the Patent Proprietor with the EPO on Dec. 22, 2023 against the Notice of Opposition filed by Jeanologia.

Reply of the patent proprietor to the notice of opposition filed against EP3829808 with the EPO on Dec. 22, 2023.

Reply to observations made by the patent proprietor filed with the EPO by Jeanologia, S.L. on Feb. 20, 2024.

Scanlab, INstallation and Operation—The RTC 4 PC Interface Board for Real Time Control of Scan Heads and Lasers, Jul. 7, 2006, Scanlab AG.

Installation and Operation—The RTC4 PC Interface Board for Real Time Control of Scan Heads and Lasers. Feb. 24, 2005.†

EC 1000TM Controller. Advanced Laser Positioning & Control for Laser Steering Systems. Software Reference Manual. Revision 2.4.0. Oct. 17, 2011.†

\* cited by examiner
† cited by third party

LASER FINISHING METHOD AND APPARATUS FOR PROVIDING A FINISHING PATTERN ON A WORKPIECE

This application is a U.S. national stage of PCT/EP2019/070824 filed on 1 Aug. 2019 which claims priority to and the benefit of European Application No. 18186840.7 filed on 1 Aug. 2018 the contents of which are incorporated herein by reference in their entireties.

FIELD OF THE INVENTION

The present invention relates to a laser finishing method and apparatus for forming a pattern on a workpiece. More in detail, the present invention relates to the workpiece finishing, e.g. fabrics and garments (and in particular denim), by use of a laser, in order to obtain a desired finishing or appearance pattern such as for example a faded, or worn finish look effect, or to reproduce an image from a graphic file, for example to replicate on the workpiece an image or a printed pattern.

BACKGROUND OF THE INVENTION

It has to be noted that, even if in the following specific reference will be made to the laser finishing of a fabric or garment, and in particular denim, the apparatus and the method according to the present invention are not limited to this application, but can be applied to any field wherein a laser beam is used to form a finishing or appearance pattern on workpiece, such as for example workpiece made of wood, or other plastic or polymeric materials, for example to replicate or simulate the grain of the wood on a workpiece.

Nowadays, in different fields there is the need of forming a predetermined finishing pattern on a workpiece, especially of those made of textile fabric, such as for example denim fabric and garments made of such fabric, such as for example jeans.

Currently available techniques of workpieces finishing may include mechanical or manual abrasion, as well as the use of chemical products intended to modify the finishing and in general the visible appearance of the workpiece, e.g. a fabric.

In particular, in the case of a coloured fabric, such for example denim, and in general of indigo dyed fabrics, the finishing process are intended to modify the colour of the dyed fiber or yarns, and/or to remove ad least part of the dyed fiber or yarns, for example to expose undyed fiber or yarns.

In some cases, the fiber/yarns is broken and thus removed from the fabric for changing its external appearance.

Known finishing process comprises for example so-called laundry or washing process wherein the fabric is subjected to washing cycles optionally with the use of elements intended to modify the fabric finishing such as stones, in the so called stone-washing process.

However, these processes have a number of drawbacks, since they require a large quantity of water and the operation of identically replicate the same finishing pattern on different workpieces depends on the individual skill of the operator and/or on the finishing conditions/parameters.

Additionally, when abrasive products or elements are used, these could negatively affect the mechanical properties of the fabric and in some cases the use of abrasive products is nowadays reduced since it has been proven to be unsafe for the operator's health. Also, as mentioned above, the stone washing process requires a large quantity of water and a plurality of operations.

There are other available techniques using a laser to change the look of a workpiece's surface. In such processes the finishing pattern is provided by a laser, which scans the working surface. In other words, the surface of the workpiece, for example a fabric, is processed by means of a laser, i.e. by means of a laser beam, wherein the localized thermal effect of the laser beam selectively removes dyes, paints or breaks yarns, according with power density values.

The output power of the laser is varied according to the pattern to be reproduced, since each change in output power value is associated with the change in abrasion along the pattern geometry and the energy of the single pulse is varied according to the specific grey tone of the image (pattern) to be reproduced. This control method has the drawback that the laser is continuously turned on and off in order to avoid abrasion in those areas of fabric that are not part of the required pattern. This continuous on/off of the laser, with different energy associated to each laser pulse, results in an unwanted rough, not smooth, look effect and in a reduced productivity, since the laser is operated in a continuous on/off state and thus at a low power level, i.e. at a power level below the maximum power level allowed by the laser source.

In view of above, it is an object of the present invention to provide a laser finishing method and apparatus able to solve the above discussed problems of known apparatuses.

More in detail, it is an object of the present invention to provide a laser finishing method and apparatus which avoid the continuous on/off transitory effect of the laser resulting in an unwanted rough, not smooth, look effect.

Another object of the present invention is to provide an apparatus and a method for the reproduction of a pattern on a workpiece by which an increased production speed and an increased productivity, with respect to known apparatuses, may be reached.

Another object of the present invention is to provide a laser finishing method and apparatus allowing a rapid marking of a predetermined pattern on a workpiece which provides a high-quality pattern due to a high accuracy formed dots.

Another object of the present invention is to provide an apparatus and a method for the formation of a pattern on a workpiece which can be easily adapted to provide different patterns.

SUMMARY OF THE INVENTION

These and other objects are achieved by a laser finishing method and apparatus according to the independent claims. Further aspects of the present invention are set out in the dependent claims.

The method for providing a finishing pattern, and the apparatus for carrying out such a method, according to the invention can be applied to different workpieces, e.g. fabrics and garments (and in particular denim), by means of a laser beam, in order to obtain a desired finishing or appearance pattern such as for example a faded, or worn finish look effect.

It has to be noted that, according to different possible embodiments, the workpiece intended to be scribed (marked) with the method according to the invention can be provided with a substantially flat shape, i.e. a workpiece which extends along two main directions (compared to a third dimension). For example, as mentioned above, the workpiece can be a fabric or garment which can be arranged on a flat support where it is processed by the laser. It has to be noted that are not excluded embodiment, wherein the workpiece is provided with a different shape, for example the workpiece is not limited to flat or substantially flat body, in fact, for example denim trousers can be scribed by the laser while they are on a mannequin, in order to simulate the real shape when worn.

According to the invention, the method comprises the step of providing command instructions for operating a laser apparatus, and in particular a laser source generating an output laser beam and moving means of the laser beam, for scribing a predetermined finishing pattern on the workpiece.

The method further comprises the step of operating the laser source, preferably a pulsed laser source, and the moving means for generating the output laser beam for scribing (marking) lines on said workpiece according to said command instructions so that the predetermined finishing pattern is formed on the workpiece.

In other words, according to the method, the finishing pattern is provided by a laser, which scans the working surface according to a plurality of lines. It has to be noted that according to the predetermined finishing pattern the energy provided by the laser beam on the workpiece, e.g. a fabric or garment, preferably a denim fabric or garment, allows providing a localized thermal effect of the laser beam intended for example to selectively removes dyes, paints or breaks yarns, according with power density values.

The method according to the invention uses a laser which operates in at least one operating mode, in order to scan lines according to said predetermined pattern on workpiece and wherein said at least one operating mode is characterized in that the output power and/or the duty cycle of the laser are kept at a constant value, preferably at the highest constant value allowed by the laser source, while scribing the predetermined pattern, and the scanning speed of the laser beam is varied (i.e. it is not constant).

Advantageously, the scanned lines forming the pattern can deliver a variable energy per unit surface in order to variably mark, or fade, different dots, areas or sections of the working surface, as required by the predetermined pattern. In some cases, the delivered energy by the laser beam is able to burn a portion of the workpiece, e.g. a fabric and in particular a portion of the yarn of the fabric, so that a cut is provided on the fabric, advantageously reproducing a wear effect.

Another advantage of the method according to the invention is that the time required for scribing (marking) the finishing pattern can be reduced with respect to known techniques and in particular with respect to known laser finishing method wherein the scanning speed of the laser beam is kept constant. This also results in an increased productivity due to the reduction of the time needed for providing the finishing pattern on the workpiece. It follows that, a greater number of workpieces can be finished according to the method of the invention compared to the number of workpieces finished, in the same time, with known techniques.

Additionally, due to the variation of the scanning speed the method according to the invention allows providing high flexibility in terms of type of pattern to be marked on the workpiece in a reduced time. In fact, the energy delivered to the workpiece can be easily and quickly modified by means of the change of the scanning speed.

For example, it is possible to provide a faded finishing (e.g. modifying colour of the workpiece for example of an indigo dyed yarn of a denim fabric) and also providing a cut on the workpiece (e.g. by providing a burn of a yarn of fabric) in the same scanning line, and with a single operation.

On the contrary, in known laser finishing apparatus and method, wherein the laser source is controlled with a constant scanning speed, in order to deliver a high quantity of energy, for example needed to provide a cut on the workpiece (e.g. to burn a yarn of a fabric), two subsequent steps are needed, i.e. two subsequent passages (marking) of the laser beam on the same point or area of the workpiece are needed.

In fact, in the disclosed method the variation of energy per unit surface delivered by the laser is controlled by changing the scanning speed of the laser beam, while the laser beam is scanning the predetermined finishing pattern, and in particular a line of the finishing pattern, on the workpiece.

According to an aspect, the line can be a straight line or a line of any other shape, for example the line of the predetermined finishing pattern can be a curve line scribed by the laser beam.

According to an aspect, e.g. when the method is used on fabric or garments and in particular on denim fabrics, the energy per unit surface delivered by the laser to the scanned workpiece causes its surface to change in colour and/or look to varying degrees, from blue or black to white or grey or can even produce holes or abrasions, and said energy per unit surface can vary while the laser beam is scribing a line on the surface to mark. More in detail, when the scanned workpiece is a denim workpiece, the laser beam removes the indigo dyes, e.g. from indigo dyed yarns of a fabric or garment preferably a denim, without damage the woven threads, or alternatively it can selectively destroy (e.g. burn) them.

According to an aspect the output power and/or duty cycle of the laser can be maintained at a constant value, preferably at the highest constant value allowed by the laser source, while the scanning speed of the laser beam is changed.

In order to keep the duty cycle at said highest constant value, the laser pulse can be modulated, according to the pattern, by varying the pulse repetition rate within a range of values, while inversely proportional varying the pulse width (i.e. varying the pulse energy).

According to an aspect, the scanning speed of the laser beam is within the range 0.1-100 m/s, preferably 0.5-70 m/s. According to an aspect, the output power is within the range 10-5000 W, preferably 100-2000 W.

According to an aspect, the maximum duty cycle allowed by the laser source is within the range 20-100%, preferably 40-85%, more preferably 50-60%.

According to an aspect, the step of providing command instructions for operating said laser apparatus comprises the steps of providing an input graphic file containing the predetermined finishing pattern to be scribed on the workpiece; associating at least one dot or section or area of the pattern to be scribed on said workpiece with a grey tone, preferably the grey tone being selected from a greyscale matrix comprising a plurality of grey tones, associating each of said grey tones with the correspondent value of energy per unit surface to be delivered on the workpiece.

More in detail, according to an aspect, each of said grey tones is associated with the correspondent value of scanning speed of the laser beam required in order to obtain said value of energy per unit surface in order to reproduce each of said grey tones on said workpiece, according to the predetermined pattern.

The scanning speed is indirectly related to the total number of laser pulses which are delivered to the workpiece, i.e. to the value of energy per unit surface, since with a lower scanning speed, more time is given to the laser to induce a pattern across the surface of the workpiece, hence, more pulses are delivered to the workpiece.

According to an aspect, said association of the grey tones with a correspondent value of energy per unit surface to be delivered on the workpiece is carried out in function on the workpiece, preferably in function of the material of which said workpiece is made of. More in detail, according to an aspect, the grey tones are associated to the scanning speed of the laser beam which in turn correspond to a value of energy per unit surface delivered.

In other words, the association of each of said grey tones with the correspondent value of scanning speed (corresponding to a value of energy per unit surface demanded by the material from which said workpiece is made) is carried out in order to reproduce each of said grey tones on the workpiece according to the predetermined finishing pattern.

According to an aspect the energy per unit surface delivered by the laser beam is varied, preferably within a single scan line, and proportionally, preferably inversely proportionally, to the intensity of the grey tones to be scribed, preferably along the single scan line, according to the predetermined finishing pattern.

According to a further aspect, the pulse repetition rate of the laser source can be varied in a range of values within 0.1-500 KHz, preferably within 0.1-200 KHz, more preferably within 0.1-100 KHz, preferably within a single scan line on said workpiece. It has to be noted that, according to an aspect, it is not excluded that the pulse repetition rate of the laser source is in a range between 0.1 KHz and 10 KHz, for example when higher energy has to be delivered and darker greytones have to be marked.

According to an aspect, the scanning speed of the laser beam is varied depending on the pulse repetition rate, preferably proportionally to the pulse repetition rate. As mentioned, the scanning speed is defined according to the pattern to be scribed, and in particular is defined according to the grey-tones of the pattern Advantageously, the method according to the invention allows to use the maximum power allowed by the laser source, e.g. a pulsed laser source.

According to a further aspect, the pulse width of the laser pulse is varied inversely proportional to the scanning speed of the laser beam.

According to an aspect, the laser source is on (preferably always on) during the scribing process of the pattern, preferably also when the laser beam crosses (passes) that sections or areas of the workpiece which do not have to be scribed, according to the predetermined finishing pattern.

It has to be noted that according to an aspect the laser source is always on while the laser beam scans the workpiece to be scribed.

According to an aspect, the laser beam does not deliver energy in correspondence of the inversion point of a scanning run, e.g. when the movement of the laser beam has to be inverted for example when a raster scan has to be inverted. In fact, when the movement is inverted the scanning speed is zero and thus, at that position, the laser beam could mark the workpiece.

The energy delivery of the laser beam can be avoided by suitable interruption means such as shutters (i.e. the laser source is on, but the laser beam is not allowed to reach the workpiece and thus it is not allowed to scribe the workpiece), or the laser source can be temporarily switched off, preferably only for a reduced amount of time needed for the movement inversion.

Therefore, according to an aspect the laser source is always on during the whole scribing process of the pattern, preferably except when the laser beam stops at the point or area where the movement of the laser beam has to be inverted.

Advantageously, the use of a laser source which is always on, preferably with the only exception in correspondence of the inversion point of a scanning run, allows to reproduce a very smooth effect on the workpiece, thus avoiding the undesired effects caused by the on-off transitory i.e. pulse to pulse instability.

According to an aspect, said step according to the invention of operating the laser source comprises a further operating mode (A) wherein the scanning speed is maintained at constant value and the output power and/or the duty cycle are maintained at a constant value, said constant value of the scanning speed and of the output power and/or of the duty cycle being selected such that the delivered energy per unit surface do not scribe the workpiece.

According to an aspect, during the further operating mode (A) the scanning speed is at maximum scanning speed.

When marking very small patterns, or patterns having small details, highest speed cannot be achieved because of physical limits of the apparatus, i.e. acceleration and deceleration of the motion system of the laser beam requires time and distance in order to reach the highest allowed values.

Advantageously, the adjustment of the scanning speed according to the invention, which is varied inversely proportional with respect to the range of values of grey tones to be marked along the pattern, allows the laser system to be adjusted to the maximum scanning speed that it can achieve, which is related to both the associated grey tone to be marked and to the shape, size and position of the pattern.

According to a further aspect a limit threshold value (K-tone) is representative of the lightest grey tone in a greyscale scribed at the lowest energy per unit surface deliverable in said operating mode (C) wherein the scanning speed of the laser beam is changed and the output power of the laser source and/or the duty cycle are maintained at a constant value, said limit threshold value (K-tone) corresponding to the maximum scanning speed of the laser beam.

According to an aspect, the step of operating the laser source and said moving means for generating said output laser beam for scribing lines of the predetermined finishing pattern on said workpiece, comprises the step of providing one or more overtravel (or overrun) movement of the laser beam. Such overtravels (or overruns) are carried out in sections or areas of the workpiece which do not have to be scribed or faded according to said predetermined finishing pattern and/or in sections or area outside said workpiece to be scribed.

In other words, the movement of the laser beam is carried out to scan an area outside the area of the workpiece to be scribed and/or outside the workpiece itself, thus providing said overtravels (or overruns), e.g. an additional run outside the area of the workpiece to be scribed.

Advantageously, by carrying out said overtravel the laser beam can reach the desired scanning speed required for effectively scribing the finishing pattern.

In other words, thanks to said overtravel, the laser beam reaches the required scanning speed (e.g. while it is moving outside the area to be scribed), thus the required scanning speed is reached when the laser beam is at the area to be scribed.

According to an aspect, overtravels of the laser beam are useful while scribing small patterns or patterns showing small details and elaborate profile. In fact, while scribing such a complex pattern, the laser beam cannot reach the highest allowed scanning speed due to physical limits of the laser apparatus, which requires certain space and time in order to reach the desired scanning speed value.

While said overtravel is performed the laser source is also on, preferably with a level of output power and/or duty cycle that is selected such that the delivered energy per unit surface do not scribe the workpiece.

The present invention also relates to an apparatus for workpiece finishing by use of a laser, and the method is preferably carried out by an apparatus according to the invention.

According to an aspect, the apparatus for providing a finishing pattern on a workpiece according to the invention comprises at least one laser source, preferably a pulsed laser source, generating an output laser beam, moving means for said laser beam and a control unit, said control unit being programmable for carrying out the method herein described and/or claimed.

According to an embodiment, the laser source is a gas laser source, preferably a $CO_2$ laser, preferably producing a laser beam having a wavelength value which is comprised in the long-wavelength IR range values, preferably from 8 μm to 15 μm, more preferably from 9.4 μm to 10.6 μm.

DESCRIPTION OF THE FIGURES

Other features, advantages and details appear, by way of example, in the following detailed description, the detailed description referring to the drawings, in which:

FIG. 5b represents a possible scanning speed profile function according to the grey-tones profile function of FIG. 5a.

DETAILED DESCRIPTION OF THE INVENTION

With reference to the figures, it is now disclosed a possible embodiment of a laser finishing method and apparatus for forming a pattern on a workpiece according to the invention, for example on fabrics or garments (and in particular denim).

It has to be noted that the term "workpiece" is used herein to indicate an object to be scribed (marked) by the apparatus 1 according to the invention that can be substantially planar, i.e. having two dimensions greater than a third dimension or can be a workpiece of any other shape. For example, as mentioned above, the workpiece can be arranged on a three-dimensional shape or arrangement, e.g. trousers or other garments can be arranged on a mannequin.

The desired finishing or appearance pattern can be for example a faded, or worn finish look effect, which can include a change in colour and/or abrasion effects, showing rips and tears on the workpiece.

Figure 1:
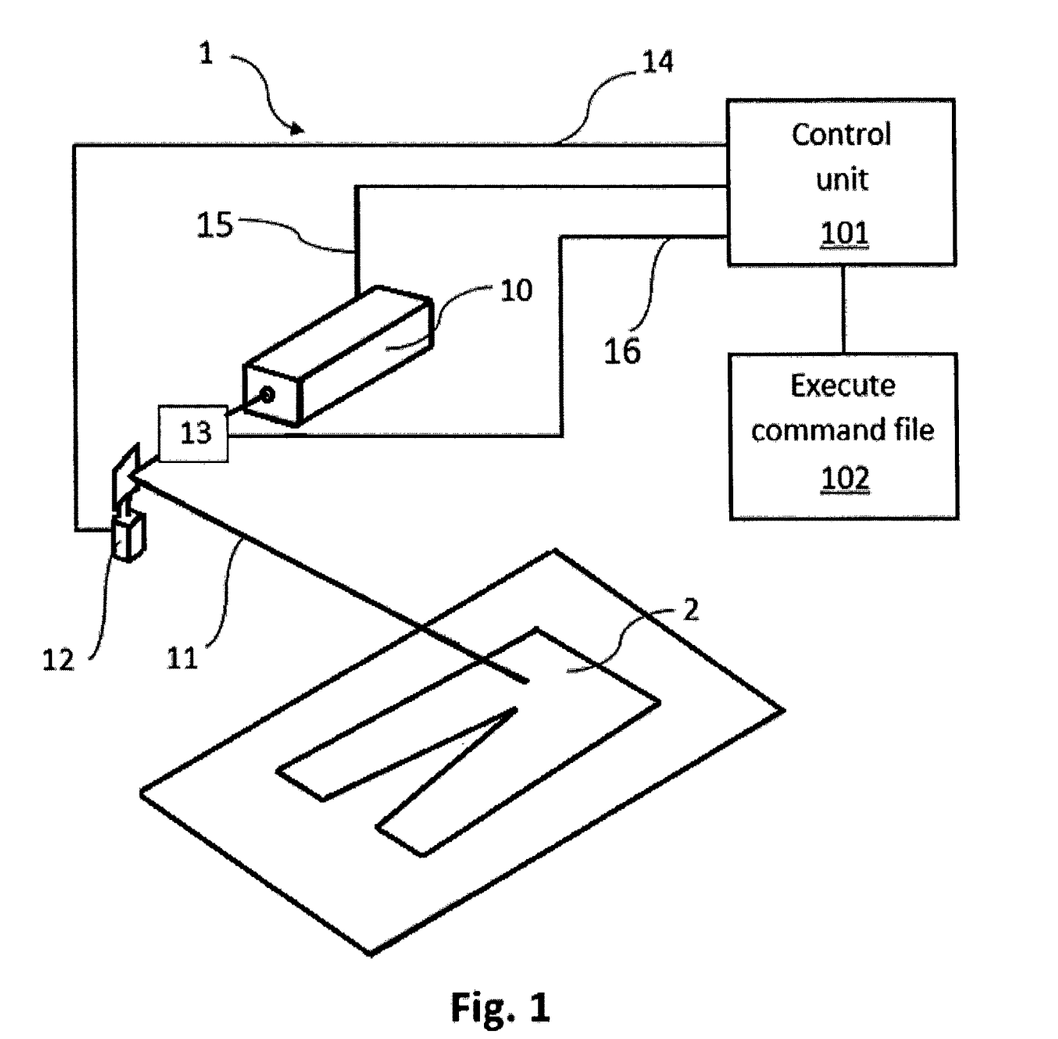
FIG. 1 is a schematic view of an embodiment of the laser apparatus according to the present invention.

A possible apparatus 1 according to the invention is schematically represented in FIG. 1.

The apparatus 1 is provided with a laser source 10, which can be a pulsed laser source, or a continuous laser source, e.g. a $CO_2$ laser source RF excited. The laser source can be controlled with a pulse width modulation technique to provide a pulsed laser beam, and which can include, but is not limited to, gas lasers, more preferably a $CO_2$ laser, preferably producing a laser beam having a wavelength value which is comprised in the long-wavelength IR range values, preferably from 8 μm to 15 μm, and more preferably comprised in the range from 9.4 μm to 10.6 μm.

It has to be noted that according to possible embodiment, the laser source can alternatively include a fiber laser, preferably producing a laser beam having a wavelength value which is comprised in near IR range values.

It has to be noted that the term "pulsed laser source" is used herein to indicate a laser source that is pulsed per se, and also continuous laser source that can be excited or modulated to provide a pulsed laser beam output (such laser sources are also known as "pulsable" laser sources, e.g. continuous laser source able to be pulsed).

The laser beam 11 scans the surface of a workpiece 2 by means of laser beam moving elements 12, which can include one or more galvanometers, preferably two galvanometers and relative mirrors, actuators or motors. The apparatus can be also provided with suitable optical elements 13, such as for example one or more mirror and/or a rotating prism and/or a lens or similar focusing optical elements, which can be positioned along the laser beam path, before or after the at least one galvanometer, and which are intended to guide the laser beam 11 reflected from the moving mirror of the moving element 12, towards the workpiece 2.

The apparatus 1 further comprises a control unit 101 which controls the laser source 10 for the laser beam 11 emission, for example by controlling the radiofrequency amplifier of the laser by a PWM signal, the moving elements 12 for moving the laser beam on the workpiece 2 and suitable optical elements 13 (if provided, e.g. before or after the moving elements 12) to receive the laser beam 11 and to focus it into a pattern line on the workpiece 2.

Said control unit 101 can be provided with a storage memory, wherein command instructions, e.g. in the form of a command file, for control the apparatus to carry out the laser scan according to the invention, can be stored.

Said control unit 101 controls said laser moving elements 12 and optionally optical elements 13 via lines 14 and 16 respectively, in order to change the scanning speed and the direction of the laser beam 11.

By changing the scanning speed V of the laser beam 11, the energy per unit surface delivered to the workpiece 2 can be varied and controlled maintaining the output power P of the laser and/or the duty cycle DC of the laser at a constant value, preferably while the laser beam 11 is scribing a line on the material.

According to a preferred embodiment, the pattern is reproduced by the laser beam 11 scanning a plurality of lines. Each line is formed by a plurality of dots, i.e. marks.

Advantageously, the shape and the accuracy of the dots can be controlled by controlling the scanning speed of the laser beam, e.g. at high scanning speed the pulse width is shorter and the elongation of the pulse is negligible, resulting in a substantially well defined circular spot, wherein the elongation effects due to the velocity are negligible. At low scanning speed the pulse width is greater and thus also in this case the elongation effect is negligible.

For example, according to possible embodiments, wherein the dot to be marked has a diameter of 2 mm, the pulse with of 400 us can be associated with a scanning speed of V=1000 mm/s, a pulse width of 5 us can be associated with a scanning speed of V=40000 mm/s.

The apparatus 1 and the method according to the invention allow to increase the precision and accuracy of the dots shape, and in particular allow to form dots with high precision thus providing high quality scribed workpieces.

Dots formed by the apparatus 1 according to the invention, can for example be provided with a diameter varying in a range between 100-500 µm and resolution (DPI i.e. dots per inch) between 5-250 dpi.

It has to be noted that, according to an aspect, said circular dots can be provided with different diameters according to the energy amount delivered by the pulse i.e. the apparatus and method according to the invention allows to control the shape and dimension of the dots of the pattern by modifying the energy associated to a pulse of the laser beam 11 intended to form each dot.

According to an aspect of the method the energy per unit surface is changed while a line is scanned on the material, i.e. the energy per unit surface can be changed from the initial value assumed at the beginning of the scribing process, at least once, and preferably continuously, during the whole scribing operation.

The energy per unit surface delivered to the workpiece 2 may be changed in different ways according to the invention. For example, the laser apparatus 1 can be controlled according to at least one operating mode.

Figure 2:
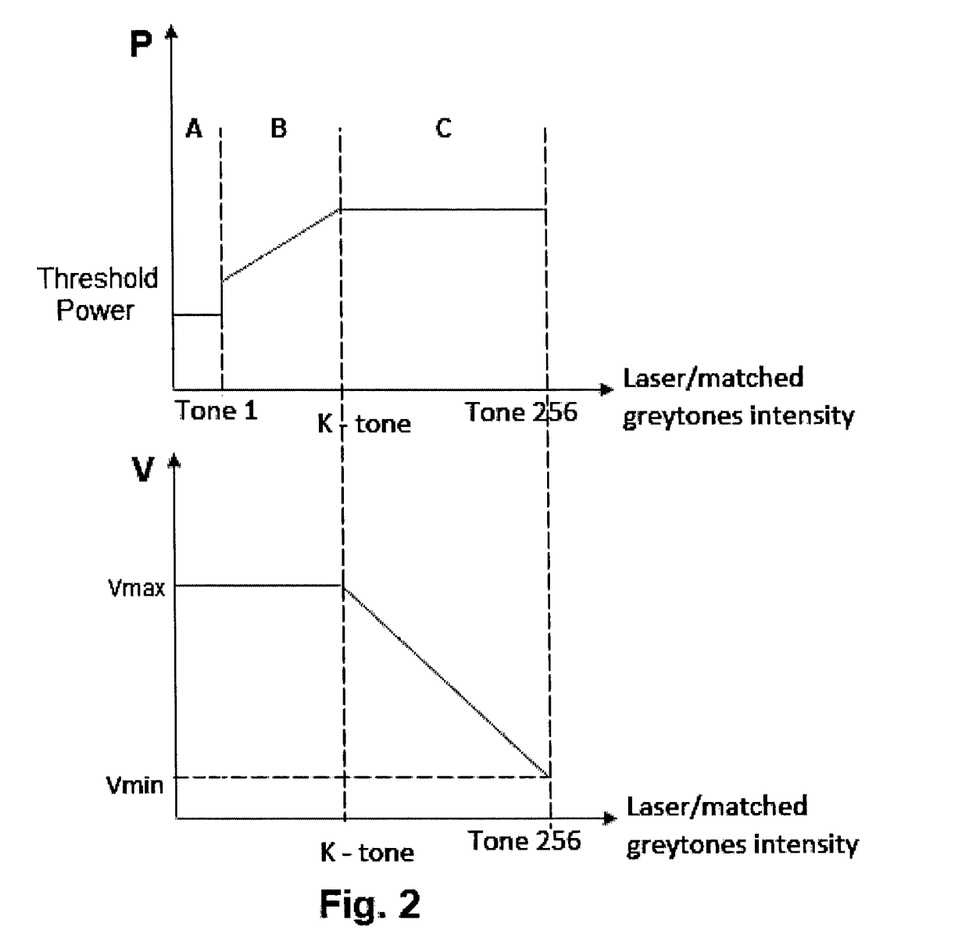
FIG. 2 shows possible embodiment of the operating modes A, B, C of the method according to the present invention in terms of output power and scanning speed.
Figure 2A:
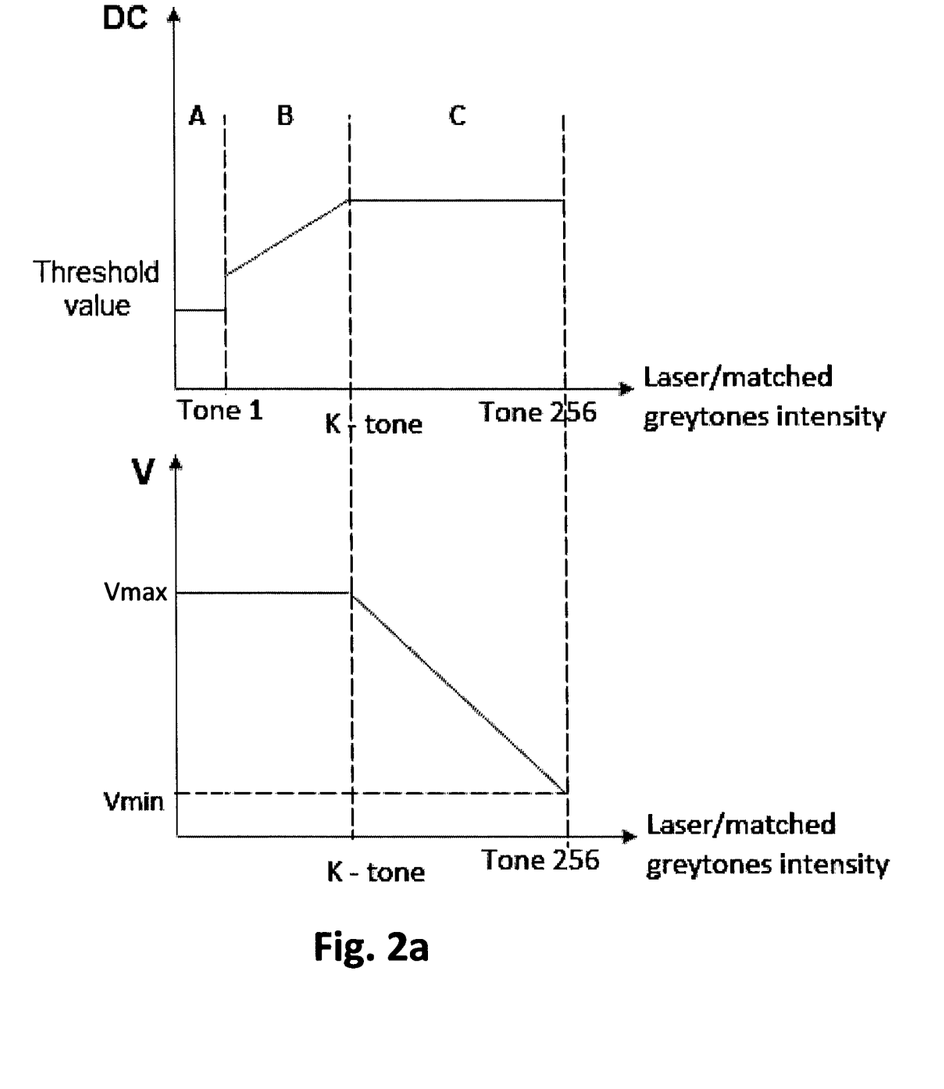
FIG. 2a shows possible embodiment of the operating modes A, B, C of the method according to the present invention in terms of duty cycle and scanning speed.

According to a possible embodiment, for example schematically shown in the attached FIGS. 2, 2*a*, three operating modes A, B, C, of the laser apparatus 1 can be used.

At least one of said operating modes, namely the operating mode C, is characterized in that the energy per unit surface of the laser, delivered to the workpiece 2 is varied by varying the scanning speed V of the laser beam 11, while keeping the output power P (e.g. the average power $P_{avg}$ of the laser) of the laser and/or the duty cycle DC at a constant value, preferably at the highest constant value allowed by the laser source 10, while scribing the predetermined pattern, in order to maintain the process efficiency as high as possible.

With reference to FIG. 2, it is represented a possible embodiment of the operating mode C, which requires the laser source 10 to be always on (preferably except when the laser beam stops at the point or area where the movement of the laser beam has to be inverted), and at a scanning speed V to be varied while the laser beam 11 is scanning the pattern, preferably varied while the laser beam 11 is scanning a line on the workpiece 2.

In the operating mode C, the duty cycle DC is maintained at a constant value, preferably at the highest constant value allowed by the laser source 10. The output power P (e.g. the average power $P_{avg}$: the rate of energy flow averaged over one full period) can be also kept constant, at the highest constant value allowed by the laser source 10.

According to a possible embodiment, in order to keep the duty cycle DC at said highest constant value, the average power and the peak power of the laser can be kept constant during the scanning operation.

As is well known the duty cycle is representative of the fractional amount of time the laser is "on" during any given period. Since in operating mode C the duty cycle DC remains constant, the discontinuities that can occur while switching the laser on and off are avoided, allowing the pattern to be marked in a very smooth way.

According to a possible embodiment, the power P and the duty cycle DC can be maintained constant since the parameter to be controlled and varied in order to vary the energy per unit surface absorbed by the workpiece is the scanning speed V of the laser beam 11, that can be changed along a scanning line.

Figure 3:
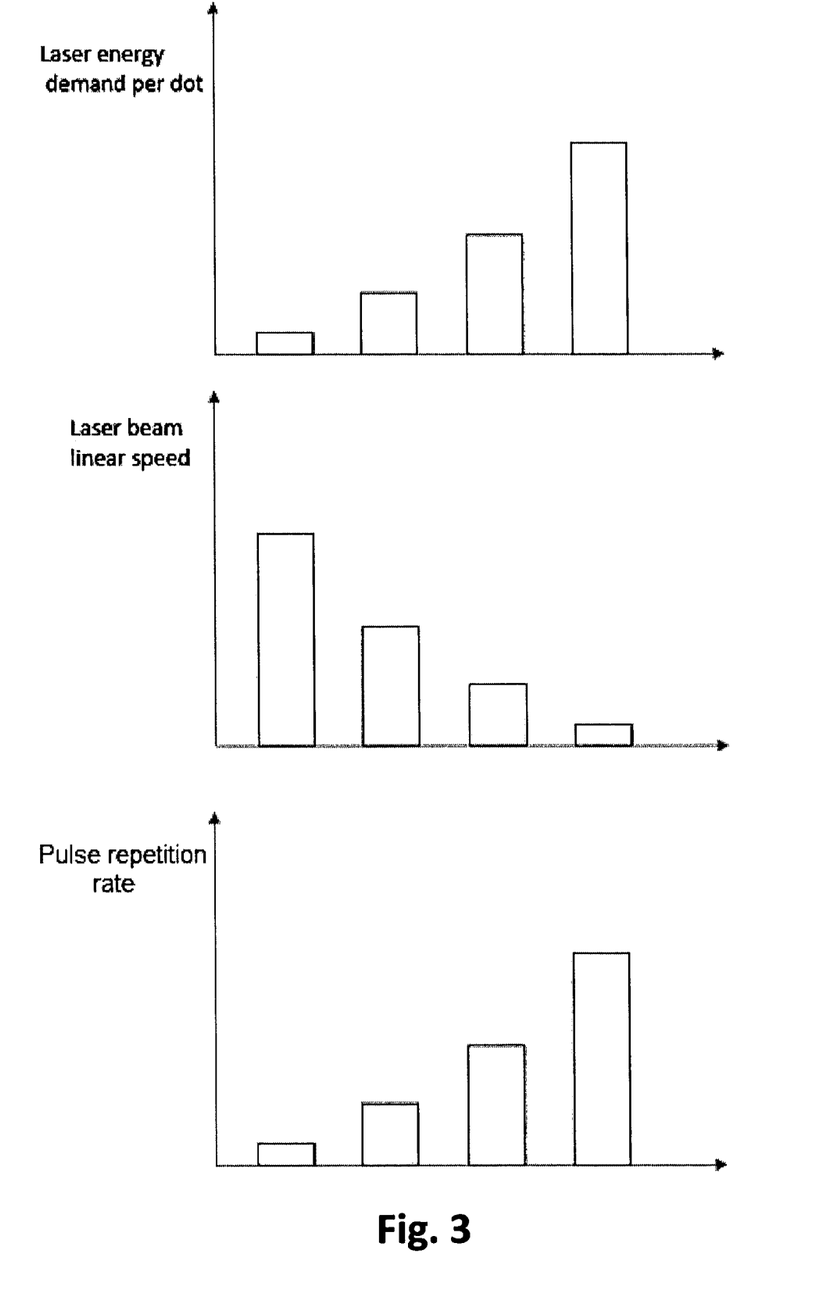
FIG. 3 schematically shows a diagram of the laser energy demanded per each dot of workpiece and of the associated value of scanning speed of the laser beam.

As for example shown in FIG. 3, the scanning speed V of the laser beam 11 is inversely proportional to the energy demanded per each dot of the fabric to be scanned, in this way, different degrees of marking (e.g. of marking of a desired grey tone) can be produced on the workpiece 2, according to the predetermined pattern.

More in detail, and as can be for example seen in FIG. 3, the control unit 101 controls the moving element 12 such that it varies the scanning speed V of the laser beam inversely proportional to the energy per unit surface demanded by the workpiece 2 ($E \propto 1/V$), i.e. the laser beam 11 scans at a higher speed those sections of the workpiece 2 which demand less energy (i.e. a lower marking (scribing) level, e.g. lower grey tone).

As can be seen in FIG. 3, and as it is well known in the art, the pulse energy delivered by the laser is inversely proportional to the pulse repetition rate inside the laser cavity ($E \propto 1/f_r$), i.e. the laser beam 11 delivers a higher energy per unit surface when it is pulsed at a low repetition rate.

More in detail, the output energy (E) of a pulsed laser can be defined as $$E = P_p t_p$$

Wherein $P_p$ is the laser's peak power and $t_p$ is the laser pulse duration, while the average power of a pulsed laser ($P_{avg}$) can be defined as:

$$P_{avg} = E f_r$$

wherein $f_r$ is the pulse repetition rate of the laser.

Pulsed lasers show higher energy levels, i.e. higher peak power levels, at lower pulse repetition rates, in view of above, in order to maintain the output power of the laser at the highest constant value allowed by the source, the pulse repetition rate $f_r$ has to be maintained as low as possible while the scanning speed of the laser has to be controlled in order to be inversely proportional to the energy demanded by each dot of the workpiece 2, according to the predetermined pattern.

FIG. 2*a* shows a possible embodiment of the operating mode C also, which requires the laser source 10 to be always on (preferably except when the laser beam stops at the point or area where the movement of the laser beam has to be inverted) and a scanning speed V which can be varied while the laser beam 11 is scanning a line on the workpiece 2. The duty cycle DC can be defined as:

$$DC = t_p f_r = \frac{t_p}{T_p}$$

Wherein $T_p$ is the time period between two adjacent pulses $$\left(T_p = \frac{1}{f_r}\right).$$

The duty cycle DC is maintained at a constant value, preferably at the highest constant value allowed by the laser source 10.

In order to keep the duty cycle DC at said highest constant value, the pulse repetition rate $f_r$ of the laser can be varied within a range of values comprised between 0.1-500 KHZ, while the pulse width $t_p$ is inversely proportional varied accordingly.

According to the apparatus and method of the present invention, the time period Ty between two adjacent pulses can be varied in a range between 2 µs and 10000 µs, i.e. the pulse repetition rate $f_r$ can be varied within a range of values between 0.1 KHz and 500 KHz. More in particular, according to an embodiment, while the laser operates in said operating mode C, the value of the pulse repetition rate can be chosen in a range of low frequency values, namely between 0.1 KHz and 10 KHz since, pulsed lasers deliver higher energy at lower pulse repetition rates, for example when higher energy has to be delivered and darker greytones have to be marked. However, according to possible embodiment, it is not excluded that while the laser operates in said operating mode C, the value of the pulse repetition rate can be chosen in a range of low frequency values, namely between 0.1 KHz and 100 KHz.

The scanning speed of the laser beam is controlled in such a manner that it is proportional to the pulse repetition rate $f_r$ during the scribing process, i.e. the scanning speed V of the laser beam is increased or decreased according to the pulse repetition rate $f_r$ which can vary in said range of low frequency values (V α $f_r$).

This result in a modulation of the energy per unit surface delivered to the workpiece 2, while maintaining the duty cycle DC at a constant high value.

According to an embodiment, the method according to the invention can comprises at least one further operating mode, see for example operating modes A and B in the figures.

In operating mode A, shown for example at left-hand part of the graphic of FIG. 2, when the laser beam 11 has to scan a portion of the surface of the workpiece 2 which does not have to be marked according to the predetermined pattern: in this operating mode A, the laser is always on (preferably except when the laser beam stops at the point or area where the movement of the laser beam has to be inverted), scanning the material at a constant speed while the output power, e.g. the average power $P_{avg}$, is maintained at a constant value under the threshold power value to have an effect on the material, preferably a low threshold value, i.e. for a denim workpiece said low threshold value is comprised within a range of values between 0.2-1 J/cm², not allowing the laser beam 11 to deliver an energy per unit surface which is high enough to mark the workpiece 2.

The said threshold power value is depending on the workpiece to be marked, and in particular is depending on the material of which the workpiece is made.

While the laser operates in said operating mode a, the duty cycle DC is maintained at a low constant value also.

The operating mode B, is the conventional operating mode, wherein the output power of the laser is modulated by modulating the pulse repetition rate $f_r$ of the laser, while the scanning speed of the beam 11 is kept constant.

The method according to the invention can provide for a, manual or automatic, switch between one or more of the possible operating modes, for example between one or more of the three operating modes A, B, C shown in the FIGS. 2, 2a.

According to an embodiment, a limit threshold value (K-tone) is representative of lowest delivered energy per unit surface, i.e. of the lightest grey tone in a greyscale that can be marked on a workpiece 2 in the operating mode C wherein the scanning speed (V) of the laser beam 11 is changed, and the output power P of the laser source and/or the duty cycle DC is constant.

The limit threshold value (K-tone) is representative of lowest delivered energy per unit surface, i.e. of the lightest grey tone in a greyscale that can be marked on a workpiece 2 maintaining the output power and/or the duty cycle at the highest constant value allowed by the laser source 10, corresponding to the maximum scanning speed V of the laser beam 11.

The limit threshold value (K-tone), as defined above, is dependent on the workpiece to be marked, and in particular dependent on the material of which the workpiece is made.

Some workpieces are made of materials that have a very low limit threshold value (K-tone), i.e. such materials can be deeply marked and faded even at very low values of delivered energy per unit surface.

When a very low degree of marking (scribing), e.g. a lower level of grey tone, required for a section (area or dot) of the selected pattern on the workpieces made of such materials having a low limit threshold value (K-tone), it is not possible to operate the laser in the operating mode C, maintaining the power at the highest allowed constant level while increasing the scanning speed, since the laser apparatus has mechanical limits, e.g. the speed of the galvanometer 12 used to scan the laser beam 11 on the workpiece 2.

In such cases, the laser enters the operating mode B, which is a conventional mode wherein the power is modulated by modulating the pulse repetition rate $f_r$, and the scanning speed is kept constant.

Figure 4:
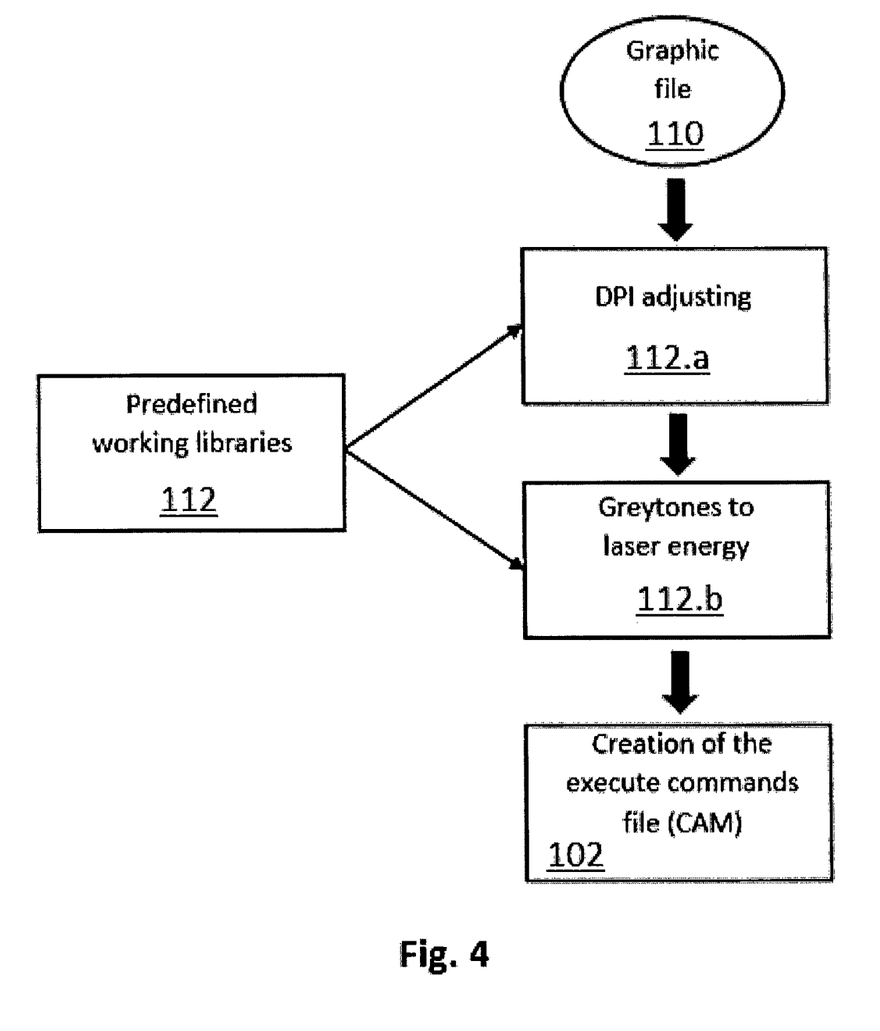
FIG. 4 is a flow chart representing a possible embodiment of the method according to the present invention for creating the command instructions for the laser finishing apparatus.

FIG. 4 shows a possible embodiment of the method steps for the generation of the command instructions, e.g. an execute command file 102, which is provided as input to the control unit 101, for scribing a pattern on a workpiece.

According to an aspect, the pattern to be scribed on the surface of the workpiece 2 is provided as a graphic file 110 (e.g. jpeg, bitmap, etc.) to a control unit which can be the same control unit provided in the laser apparatus or can be a separate control unit.

Standard libraries 112 comprising for example a greyscale matrix 112.a, comprising a plurality of grey tones (ni) and a library 112.b suitable to adjust the PPI (pixels per inch) of the graphic file can be provided to said control unit so that each grey tone (ni) can be associated to a certain value of scanning speed of the laser beam 11, corresponding to a value of energy per unit surface demanded by the workpiece 2 in order to obtain that grey tone (ni).

The PPI have to be adjusted, for example through non-linear interpolation of the graphic file, in order to optimize the resolution of the pattern to be printed, according to the resolution of the laser.

According to a possible embodiment, the greyscale matrix has rectangular blocks, each block corresponds to a different 8-bit grayscale value or tone, i.e. there are 256 different grey tones, from 1 to 256 that can be scribed by the laser beam on the workpiece. According to another possible embodiment, each block of the greyscale matrix can correspond to a different 16-bit grayscale value or tone, i.e. there are 65536 different grey tones that can be scribed by the laser beam on the workpiece. It has to be noted that, even if in the attached figures a grayscale having 256 allowable gray tones has been shown, features and aspect herein disclosed with reference to the figures and to said 256 tones grayscale, can be applied to different grayscales, e.g. a grayscale comprising 65536 grey tones that can be scribed by the laser beam on the workpiece.

In FIG. 2 the output power of the laser is represented as a function of the intensity of the grey tones ($n_i$) of a greyscale having 256 allowable grey tones to be printed on the workpiece 2. The same is applicable to FIG. 2a with reference to the duty cycle DC, wherein the duty cycle DC is represented as a function of the intensity of the grey tones ($n_i$) of a greyscale having 256 allowable grey tones to be printed on the workpiece 2.

The energy per unit surface demanded by each dot of the workpiece 2 is proportional to the intensity of the grey tone to be printed ($E_i \propto n_i$), while the scanning speed is inversely proportional to the said intensity ($V \propto 1/n_i$).

As can be seen, any desired amount of control in scribing the pattern can be provided, limited only by the amount of energy per unit surface delivered by the laser beam 11.

This technique allows the operator to choose the desired pattern to be scribed on the workpiece 2 in order to obtain the worn look, by specifying the degree of marking (scribing) e.g. a level of grey tone, which is a percentage of the maximum deliverable energy per unit surface.

The operator associates different dots, or areas of the pattern with different energy levels, by associating each level of scanning speed V with a grey tone (ni) of the given greyscale.

Figure 5A:
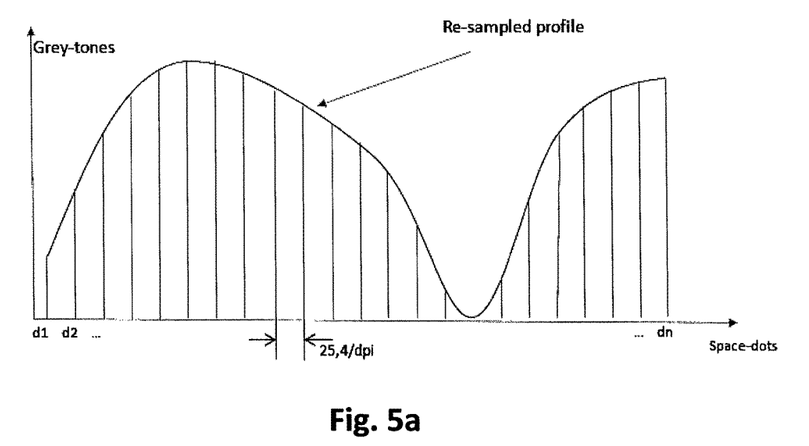
FIG. 5a represents a possible grey-tones profile function for marking a workpiece.
Figure 5B:
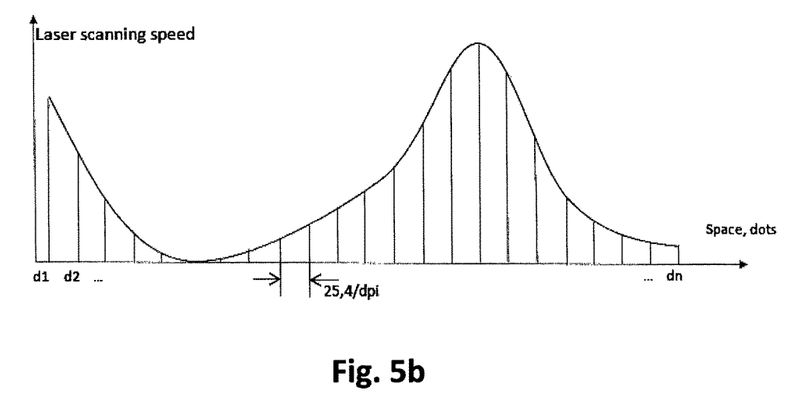

In other words, as can be seen from FIGS. 5a and 5b, each of these dots or areas will be scribed, according to the pattern, with a specified scanning speed profile, associated to the tones of the greyscale matrix.

The raster file according to the pattern to be scribed allows to reproduce at least one sequence of dots equally spaced from each other.

The distance between subsequent dots can be computed by using a conversion factor which, in a possible embodiment, as shown for example in FIGS. 5a and 5b, corresponds to 25.4/dpi.

The scanning speed profiles represent different laser intensities and thus different degrees of wear.

For example, the lighter sections of the pattern to be printed, represented by the minimum in the grey-tones profile function of FIG. 5a, may be associated with a lower energy per unit surface, which corresponds to set a higher scanning speed, represented by the maximum in the scanning speed profile function of FIG. 5b, in order to reproduce a lighter worn look.

The darker sections of the pattern to be printed, represented by the maxima in the grey-tones profile function of FIG. 5a, may be associated with higher energy per unit surface, which corresponds to set a lower scanning speed, represented by the minima in the scanning speed profile function of FIG. 5b, in order to reproduce a heavier worn look.

The settled values of scanning speed profile can be saved and are stored as part of the command instructions, and in particular of an execute command file, to be provided as input to the control unit 101.

Such a file communicates to the control unit 101 the parameters required to convert the desired pattern into laser control command instructions.

It has to be noted that the file can be a bit-map, or raster file. Each value of the raster matrix file represents a scanning speed value for each pixel of the original graphic file.

The invention claimed is:

1. A method for providing a finishing pattern on a workpiece (2) by a laser apparatus (1) comprising at least one laser source (10), generating an output laser beam (11), moving means (12) for moving said laser beam and a control unit (101) for controlling said laser source (10) and said moving means (12), the method comprising the steps of:
   providing command instructions for operating said laser apparatus (1) for scribing a predetermined finishing pattern on a workpiece (2),
   operating said laser source (10) and said moving means (12) for generating said output laser beam (11) for scribing lines of the predetermined finishing pattern on said workpiece (2) according to said command instructions,
   wherein said step of operating said laser source comprises varying a scanning speed (V) of the laser beam (11) and maintaining a duty cycle (DC) of the laser beam (11) at a constant value, wherein varying the scanning speed (V) of the laser beam (11) comprises varying the scanning speed (V) of the laser beam (11) proportionally to a pulse repetition rate ($f_r$) of the laser source (10).

2. The method according to claim 1, characterized in that the laser source (10) is on when the laser beam (11) scans sections or areas of the workpiece which do not have to be scribed or faded according to said predetermined finishing pattern.

3. The method according to claim 1, wherein the step of operating the laser source (10) and said moving means (12) for generating said output laser beam (11) for scribing lines of the predetermined finishing pattern on said workpiece (2) comprises the step of providing one or more overtravel of the laser beam carried out in sections or areas of the workpiece which do not have to be scribed or faded according to said predetermined finishing pattern, or in sections or area outside said workpiece to be scribed.

4. The method according to claim 3, wherein when said overtravel is performed the laser source (10) is on, and wherein at least one of a level of output power and a duty cycle that is selected such that the delivered energy per unit surface does not scribe the workpiece.

5. The method according to claim 1, wherein said constant value of the duty cycle (DC) is the highest constant value allowed by the laser source (10).

6. The method according to claim 1, wherein the command instructions for operating said laser apparatus (1) are provided in a control file (102).

7. The method according to claim 1, wherein said step of providing command instructions for operating said laser apparatus (1) comprises:
   providing an input graphic file (110) containing the predetermined finishing pattern to be scribed on the workpiece (2);
   associating at least one dot, or section, or area of the pattern to be scribed on said workpiece (2) with a grey tone (ni), the grey tone being selected from a greyscale matrix (112.b) comprising a plurality of grey tones (ni);
   associating each of said grey tones (ni) with the correspondent value of energy per unit surface to be delivered on the workpiece (2).

8. The method according to claim 7, wherein said association of said grey tone (ni) with the correspondent value of energy per unit surface to be delivered on the workpiece (2) is carried out in function of the workpiece.

9. The method according to claim 7, characterized in that the scanning speed (V) of the laser beam (11) is varied inversely proportionally to the intensity value of the grey tones (ni) to be scribed along the pattern.

10. The method according to claim 1, wherein said energy per unit surface delivered by said laser beam (11) is varied proportionally to the intensity of the grey tones (ni) to be scribed according to the predetermined finishing pattern.

11. The method according to claim 1, wherein the scanning speed (V) of the laser beam is varied inversely proportional to the demanded energy per unit surface corresponding to the intensity of the grey tones (ni) to be scribed according to the predetermined finishing pattern.

12. The method according to claim 1, characterized in that the pulse repetition rate (fr) of the laser source (10) can be varied in a range of values within 0.1-500 KHz within a single scan line on said workpiece (2).

13. The method according to claim 1, wherein said step of operating the laser source comprises a further operating mode (A) wherein the scanning speed (V) is maintained at constant value and at least one of the output power (P) and the duty cycle (DC) is maintained at a constant value, said constant value being selected such that the delivered energy per unit surface does do not scribe the workpiece (2).

14. The method according to claim 13, wherein in said further operating mode (A) wherein the scanning speed (V) is maintained at constant value and at least one of the output power (P) and the duty cycle (DC) is maintained at a constant value, the scanning speed is at maximum scanning speed (11).

15. The method according to claim 1, wherein a limit threshold value (K-tone) is representative of the lightest grey tone in a greyscale scribed at the lowest energy per unit surface deliverable by said laser beam (11), said limit threshold value (K-tone) corresponding to the maximum scanning speed (V) of the laser beam (11).

16. The method according to claim 1, wherein said workpiece (2) is a fabric or a garment.

17. The method according to claim 1, wherein said moving means (12) of the laser beam comprises at least one galvanometer, said command instructions being provided for operating said at least one galvanometer at said scanning speed (V) of the laser beam (11).

18. The method according to claim 1, wherein said scanning speed (V) of the laser beam (11) is within the range 0.1-100 m/s.

19. The method according to claim 1, wherein the output power (P) of the laser beam is within the range 10-5000 W.

20. The method according to claim 1, wherein the maximum duty cycle (DC) allowed by the laser source is within the range 20-100%.

21. An apparatus (1) for providing a finishing pattern on a workpiece (2) comprising at least one laser source (10) generating an output laser beam (11), moving means (12) for said laser beam and a control unit (101), said control unit being programmable for controlling said laser source (10) and said moving means (12) according to the method of claim 1.

* * * * *